United States Patent
Chen et al.

(10) Patent No.: US 12,356,018 B2
(45) Date of Patent: *Jul. 8, 2025

(54) SOURCE COLOR VOLUME INFORMATION MESSAGING

(71) Applicant: Dolby Laboratories Licensing Corporation, San Francisco, CA (US)

(72) Inventors: Tao Chen, Palo Alto, CA (US); Peng Yin, Ithaca, NY (US); Taoran Lu, Santa Clara, CA (US); Walter J. Husak, Simi Valley, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/758,055

(22) Filed: Jun. 28, 2024

(65) Prior Publication Data

US 2024/0357183 A1 Oct. 24, 2024

Related U.S. Application Data

(63) Continuation of application No. 18/596,494, filed on Mar. 5, 2024, now Pat. No. 12,075,098, and a
(Continued)

(51) Int. Cl.
*H04N 19/70* (2014.01)
*H04N 19/14* (2014.01)
(Continued)

(52) U.S. Cl.
CPC ............. *H04N 19/70* (2014.11); *H04N 19/14* (2014.11); *H04N 19/186* (2014.11); *H04N 19/20* (2014.11)

(58) Field of Classification Search
None
See application file for complete search history.

(56) References Cited

U.S. PATENT DOCUMENTS

| 6,018,366 A | 1/2000 | Asai |
| 8,837,907 B2 | 9/2014 | Date |

(Continued)

FOREIGN PATENT DOCUMENTS

| CN | 101132472 A | 2/2008 |
| CN | 103098453 A | 5/2013 |

(Continued)

OTHER PUBLICATIONS

Francois et al., "High Dynamic Range and Wide Color Gamut Video Coding in HEVC: Status and Potential Future Enhancements," IEEE Transactions on Circuits and Systems for Video Technology, vol. 26, No. 1, pp. 63-75, Jan. 2016, doi: 10.1109/TCSVT.2015.2461911 (Year: 2016).*

(Continued)

*Primary Examiner* — Mainul Hasan

(57) ABSTRACT

Methods are described to communicate source color volume information in a coded bitstream using SEI messaging. Such data include at least the minimum, maximum, and average luminance values in the source data plus optional data that may include the color volume x and y chromaticity coordinates for the input color primaries (e.g., red, green, and blue) of the source data, and the color x and y chromaticity coordinates for the color primaries corresponding to the minimum, average, and maximum luminance values in the source data. Messaging data signaling an active region in each picture may also be included.

4 Claims, 5 Drawing Sheets

Related U.S. Application Data continuation of application No. 18/596,515, filed on Mar. 5, 2024, now Pat. No. 12,108,086, said application No. 18/596,494 is a continuation of application No. 18/486,697, filed on Oct. 13, 2023, said application No. 18/596,515 is a continuation of application No. 18/486,697, filed on Oct. 13, 2023, which is a continuation of application No. 18/162,492, filed on Jan. 31, 2023, now Pat. No. 12,096,038, which is a continuation of application No. 17/009,584, filed on Sep. 1, 2020, now Pat. No. 11,595,693, which is a continuation of application No. 16/339,992, filed as application No. PCT/US2017/054920 on Oct. 3, 2017, now Pat. No. 10,779,008.

(60) Provisional application No. 62/427,677, filed on Nov. 29, 2016, provisional application No. 62/404,302, filed on Oct. 5, 2016.

(51) Int. Cl.
*H04N 19/186* (2014.01)
*H04N 19/20* (2014.01)

(56) References Cited

U.S. PATENT DOCUMENTS

| | | | | |
|---|---|---|---|---|
| 9,024,961 | B2* | 5/2015 | Longhurst | H04N 23/86 358/463 |
| 9,111,330 | B2 | 8/2015 | Messmer | |
| 9,628,808 | B2* | 4/2017 | Su | H04N 19/70 |
| 10,080,026 | B2* | 9/2018 | Su | H04N 19/1887 |
| 10,129,558 | B2 | 11/2018 | Ramasubramonian | |
| 10,171,849 | B1* | 1/2019 | Hwang | H04N 21/2662 |
| 10,779,008 | B2* | 9/2020 | Chen | H04N 19/186 |
| 11,595,693 | B2* | 2/2023 | Chen | H04N 21/2353 |
| 2003/0122845 | A1* | 7/2003 | Lee | H04N 9/77 345/589 |
| 2004/0113875 | A1* | 6/2004 | Miller | G09G 3/3216 345/82 |
| 2004/0222999 | A1 | 11/2004 | Choi | |
| 2007/0160128 | A1 | 7/2007 | Tian | |
| 2008/0186413 | A1 | 8/2008 | Someya | |
| 2008/0291476 | A1* | 11/2008 | Higuchi | H04N 1/6058 358/1.9 |
| 2009/0052858 | A1 | 2/2009 | Date | |
| 2010/0020242 | A1* | 1/2010 | Lammers | G09G 5/02 348/642 |
| 2010/0073338 | A1* | 3/2010 | Miller | G09G 3/3233 345/205 |
| 2010/0128055 | A1* | 5/2010 | Blonde | H04N 1/6058 345/590 |
| 2012/0315011 | A1 | 12/2012 | Messmer | |
| 2013/0076763 | A1 | 3/2013 | Messmer | |
| 2013/0120656 | A1 | 5/2013 | Wilson | |
| 2013/0155330 | A1 | 6/2013 | Longhurst | |
| 2013/0328907 | A1* | 12/2013 | Ballestad | H04N 9/68 345/590 |
| 2014/0002478 | A1* | 1/2014 | Ballestad | H04N 1/6027 345/589 |
| 2014/0098896 | A1 | 4/2014 | Wang | |
| 2014/0192149 | A1 | 7/2014 | Wang | |
| 2014/0333660 | A1* | 11/2014 | Ballestad | G06T 11/001 345/589 |
| 2015/0003749 | A1 | 1/2015 | Kim | |
| 2015/0201222 | A1* | 7/2015 | Mertens | H04N 19/182 382/233 |
| 2016/0005349 | A1 | 1/2016 | Atkins et al. | |
| 2016/0037019 | A1 | 2/2016 | Xue | |
| 2016/0080716 | A1 | 3/2016 | Atkins | |
| 2016/0112714 | A1 | 4/2016 | Hattori | |
| 2016/0227227 | A1 | 8/2016 | Deshpande | |
| 2016/0286226 | A1 | 9/2016 | Ridge | |
| 2016/0286241 | A1 | 9/2016 | Ridge | |
| 2016/0358584 | A1* | 12/2016 | Greenebaum | H04N 1/6088 |
| 2017/0078724 | A1* | 3/2017 | Wilson | H04N 21/25825 |
| 2017/0085880 | A1 | 3/2017 | Minoo | |
| 2017/0085887 | A1* | 3/2017 | Rosewarne | H04N 9/67 |
| 2017/0085896 | A1 | 3/2017 | Ramasubramonian | |
| 2017/0171576 | A1* | 6/2017 | Oh | H04N 21/236 |
| 2017/0171578 | A1 | 6/2017 | Joong | |
| 2017/0332085 | A1* | 11/2017 | Ramasubramonian | H04N 19/167 |
| 2017/0339418 | A1* | 11/2017 | Ramasubramonian | H04N 19/136 |
| 2017/0374313 | A1* | 12/2017 | Oh | H04N 21/2353 |
| 2018/0007363 | A1* | 1/2018 | Oh | H04N 21/816 |
| 2018/0048913 | A1 | 2/2018 | Sole Rojals | |
| 2018/0063500 | A1* | 3/2018 | Rusanovskyy | H04N 21/4122 |
| 2018/0070107 | A1 | 3/2018 | Ramasubramonian | |
| 2018/0077453 | A1* | 3/2018 | Oh | H04N 21/44029 |
| 2018/0152721 | A1* | 5/2018 | Rusanovskyy | H04N 19/46 |
| 2018/0176609 | A1* | 6/2018 | Oh | H04N 7/01 |
| 2018/0205975 | A1* | 7/2018 | Oh | H04N 21/4884 |
| 2018/0219764 | A1* | 8/2018 | Oh | H04H 20/72 |
| 2018/0262731 | A1* | 9/2018 | Oh | H04N 21/4345 |
| 2018/0302663 | A1* | 10/2018 | Yoshizawa | H04N 21/4312 |
| 2019/0007709 | A1* | 1/2019 | Oh | H04N 21/4348 |
| 2019/0045209 | A1 | 2/2019 | Ramasubramonian | |
| 2019/0215566 | A1* | 7/2019 | Shimizu | H04N 5/913 |
| 2020/0043125 | A1 | 2/2020 | Yeung | |
| 2020/0053334 | A1 | 2/2020 | Oh | |
| 2020/0296428 | A1 | 9/2020 | Andrivon | |
| 2024/0214611 | A1 | 6/2024 | Chen | |

FOREIGN PATENT DOCUMENTS

| | | | | |
|---|---|---|---|---|
| CN | 103180891 | A | 6/2013 | |
| CN | 103873738 | A | 6/2014 | |
| CN | 105594215 | A | 5/2016 | |
| EP | 1784024 | A1 | 5/2007 | |
| EP | 2187337 | A1 | 5/2010 | |
| EP | 3010231 | | 4/2016 | |
| EP | 3010231 | A1* | 4/2016 | G09G 5/02 |
| EP | 3059937 | | 8/2016 | |
| EP | 3059937 | A1* | 8/2016 | H04N 1/6025 |
| JP | 2006222790 | A | 8/2006 | |
| JP | 2019208275 | A | 12/2019 | |
| KR | 20160054039 | A | 5/2016 | |
| WO | 2012166382 | A2 | 12/2012 | |
| WO | 2016080754 | A1 | 5/2016 | |
| WO | 2016118395 | A1 | 7/2016 | |
| WO | WO-2018067552 | A1* | 4/2018 | H04N 19/14 |

OTHER PUBLICATIONS

"Color Management for Future Video Systems"—Senfar Wen; Proceedings of the IEEE (vol. 101, Issue: 1, 2013, pp. 31-44); Publication Date: May 31, 2012 (Year: 2012).*

"High Dynamic Range and Wide Color Gamut Video Coding in HEVC: Status and Potential Future Enhancements"—Francois et al.; IEEE Transactions on Circuits and Systems for Video Technology, vol. 26, No. 1, Jan. 2016 (Year: 2016).*

"Automatic Letter/Pillarbox Detection for Optimized Display of Digital TV"—Carreira et al.; 2014 International Conference on Signal Processing and Multimedia Applications (SIGMAP), Date of Conference: Aug. 28-30, 2014 (Year: 2014).*

"HEVC Screen Content Coding Draft Text 6", JCTVC-W1005, Mar. 2016, San Diego, USA, pp. 1-675.

A.K. Ramasubramonian, "Content colour volume SEI message", JCTVC-X0069, May 2016, Geneva, CH, pp. 1-4.

A.M. Tourapis, "Improvements to the Effective Colour Volume SEI", JCTVC-X0052, May 2016, Geneva, CH, pp. 1-8.

H.M. Oh et al., "Content colour gamut SEI message", JCTVC-X0040, May 2016, Geneva, CH, pp. 1-4.

Rec. ITU-T H.265, "Series H: Audiovisual and Multimedia systems, Infrastructure of audiovisual services—Coding of moving video, High efficiency video coding," ITU, Oct. 2014, pp. 1-540.

(56) References Cited

OTHER PUBLICATIONS

SMPTE ST 2094-1:2016: "Dynamic Metadata for Color Volume Transform—Core Components" May 18, 2016, pp. 1-15.
SMPTE Standard "Dynamic Metadata for Color Volume Transform—Application #1" SMPTE ST 2094-10:2016, May 18, 2016, pp. 1-15.
Tao Chen et al., "AHG 7: On Content Colour Volume SEI Message", (JCTVC-Y0032), JCT-VC of ITU-T SG16 WP3 and ISO/IEC JTC1/SC29/WG11, 25th Meeting: Chengdu, CN, (Oct. 15, 2016), pp. 1-5.
Francois et al., "High Dynamic Range and Wide Color Gamut Video Coding in HEVC: Status and Potential Future Enhancement," IEEE Transactions on Circuits and Systems for Video Technology, vol. 26, No. 1, Jan. 2016, pp. 63-75.
Smith, "Ultra HD Blu-ray Format Video Characteristics," Digital Object Identifier, 10.5594/JMI.2016.2563078; Date of publication: Jul. 6, 2016 (Year: 2016), pp. 14-27, 14 pages.
SMPTE "Study Group Report High-Dynamic-Range (HDR) Imaging Ecosystem", Sep. 19, 2015, XP055250336, pp. 1-53, 53 pages.
Mahmalat et al., "Luminance Independent Chromaticity Preprocessing for HDR Video Coding" Disney Research; 978-1-4673-9961-6/16/$31.00 © 2016 IEEE., Sep. 2016, pp. 1389-1393, 5 pages.
Andrivon et al., "Reference-based Color vol. Remapping" SMPTE 2015 Annual Technical Conference and Exhibition, Oct. 26-29, 2015, pp. 1-14, 14 pages.
Lu et al., "Compression Efficiency Improvement over HEVC Main 10 Profile for HDR and WCG Content" 2016 Data Compression Conference (DCC), Mar. 30-Apr. 1, 2016, pp. 279-288, 10 pages.

\* cited by examiner

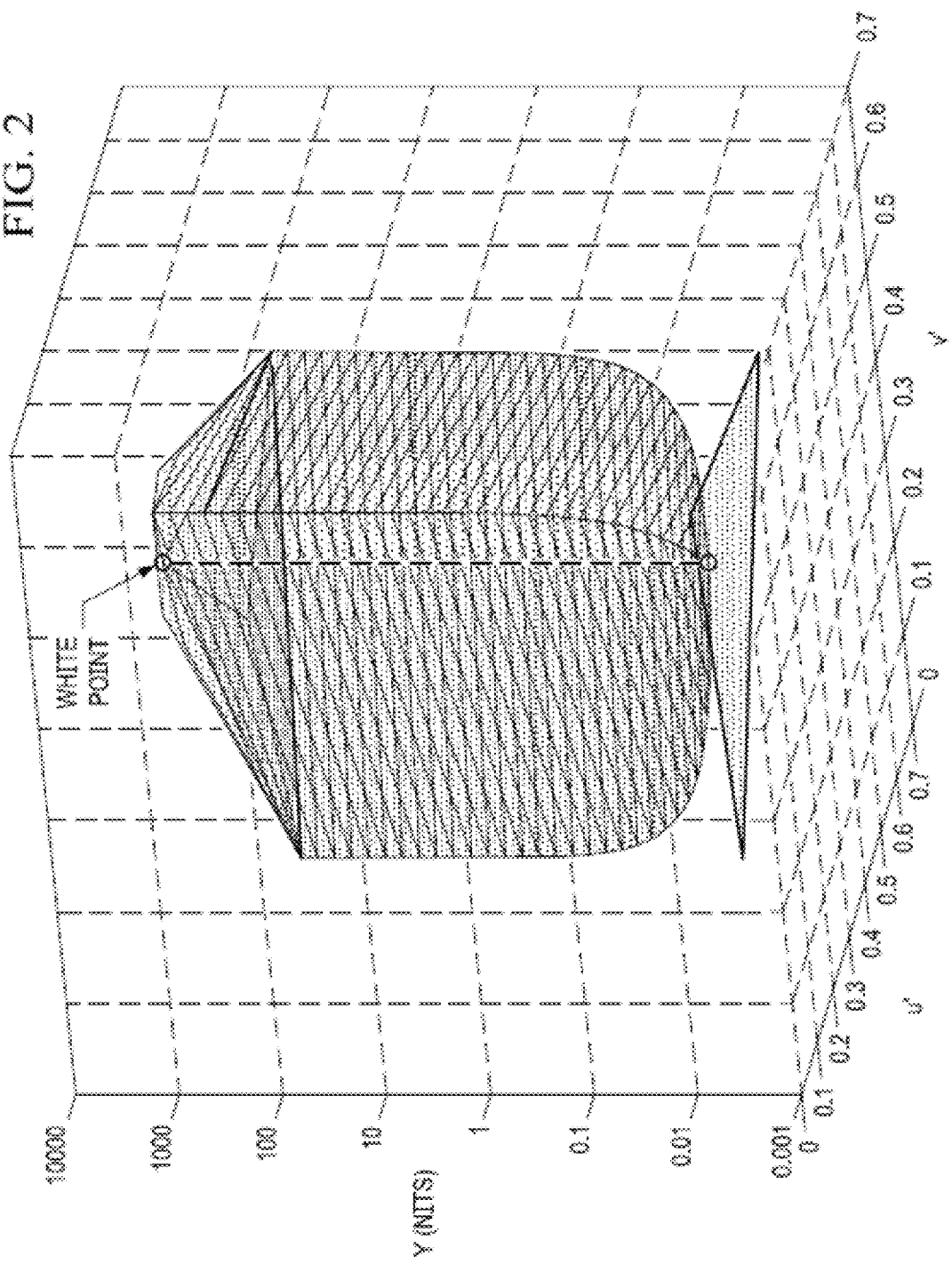

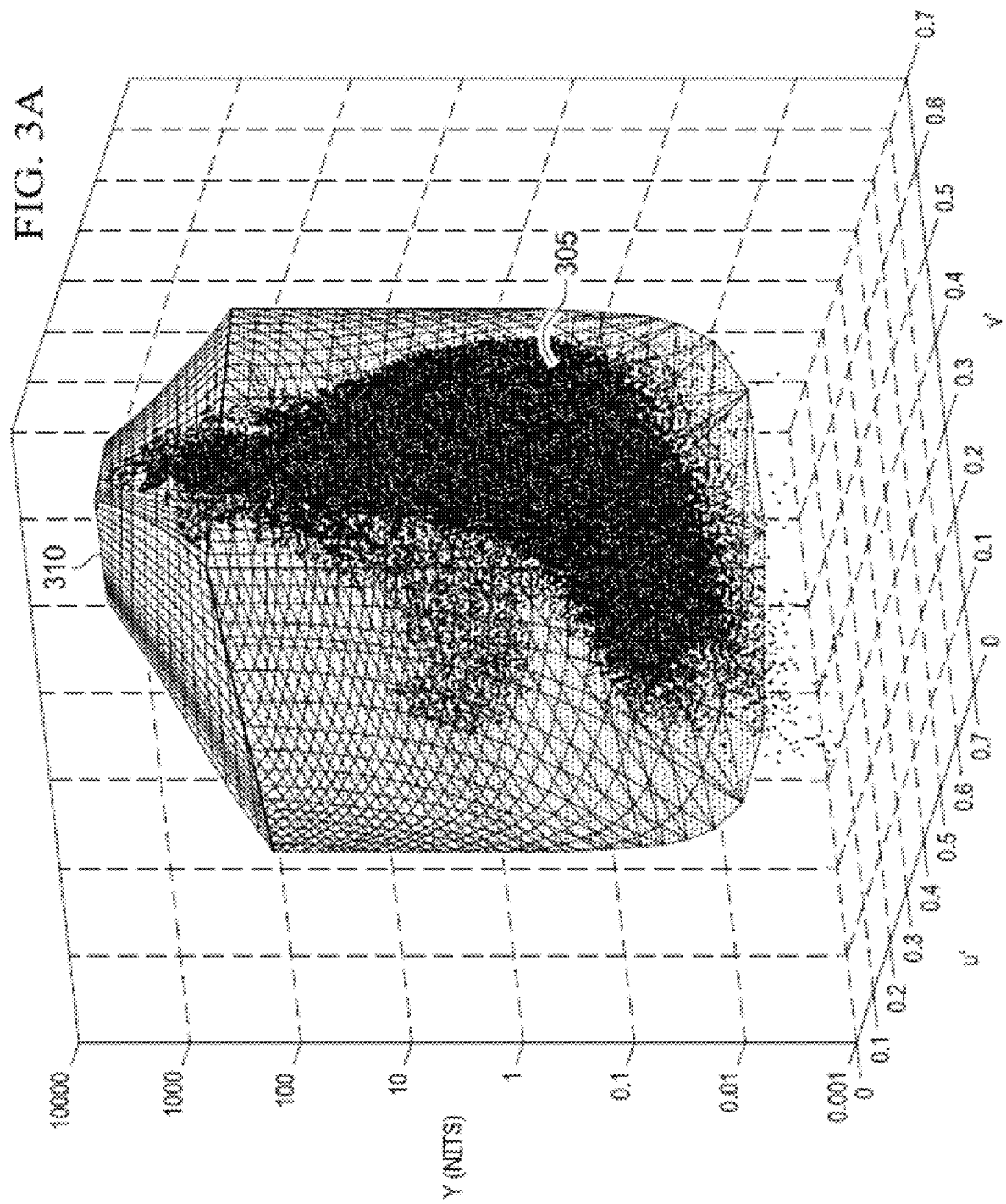

SOURCE COLOR VOLUME INFORMATION MESSAGING

CROSS-REFERENCE TO RELATED APPLICATIONS

This application is a continuation of U.S. patent application Ser. No. 18/596,515, filed on Mar. 5, 2024, which is a continuation of U.S. patent application Ser. No. 18/486,697, filed on Oct. 13, 2023; this application is a continuation of U.S. patent application Ser. No. 18/596,494, filed on Mar. 5, 2024, which is a continuation of U.S. patent application Ser. No. 18/486,697, filed on Oct. 13, 2023, which is a continuation of U.S. patent application Ser. No. 18/162,492, filed on Jan. 31, 2023, which is a continuation of U.S. patent application Ser. No. 17/009,584, filed on Sep. 1, 2020, now U.S. Pat. No. 11,595,693 (issued on 28 Feb. 2023), which is a continuation of U.S. patent application Ser. No. 16/339,992, filed on Apr. 5, 2019, now U.S. Pat. No. 10,779,008 (issued 15 Sep. 2020), which is the national stage entry of PCT Application PCT/US2017/054920, filed on Oct. 3, 2017, which claims the benefit of priority to U.S. Provisional Patent Application No. 62/427,677, filed on Nov. 29, 2016, and to U.S. Provisional Patent Application No. 62/404,302, filed on Oct. 5, 2016, all of which are hereby incorporated by reference in their entirety.

TECHNOLOGY

The present invention relates generally to images. More particularly, an embodiment of the present invention relates to communicating and processing source color volume information.

BACKGROUND

Recommendation ITU-T H.265 [1] (also known as HEVC) for "coding of moving video," in Annex D, "Supplemental enhancement information" (SEI), and Annex E, "Video usability information" (VUI), describes the syntax for providing supplemental SEI and VUI information in a coded bitstream to enable a decoder to better map the decoded samples into a display.

In parallel with the MPEG/ITU standardization processes, the society of motion picture and television engineers (SMPTE) has also defined a number of Recommendations related to communicating metadata related to the color volume information for both the source video and a targeted display. For example, the SMPTE ST 2094 suite of documents (e.g., [5] and [6]) define metadata for use in color volume transforms of video content. These metadata may vary scene-by-scene or frame-by-frame. For example, such metadata may assist a decoder to present high-dynamic range (HDR) and wide color gamut (WCG) data on a display having a smaller color volume than that of the mastering display used for mastering the source images.

As used herein, the term "metadata" relates to any auxiliary information that is transmitted as part of the coded bitstream and assists a decoder to render a decoded image. Such metadata may include, but are not limited to, color space or gamut information, prediction parameters, reference display parameters, and auxiliary signal parameters, as those described herein.

While Annexes D and E of H.265 support a number of color volume related metadata, they do not carry all the required metadata for the most efficient display management of HDR content. In July of 2016, in the joint collaborative team on video coding (JCT-VC) meeting in Geneva, three proposals [2-4] were submitted on how to describe content color volume information using SEI or VUI messaging. Some of these proposals were influenced by SMPTE ST. 2094 [5], but they were considerably different in scope.

In [2], a content-SEI message is proposed to signal content color gamut in 2D, which describes the actual color distribution of the video content. In VUI, the variable colour_primaries is used to indicate the container color gamut instead of true source color gamut [1]. In [3], multiple primary expressions and spatial regions are proposed to be associated with the identified source characteristics. In [4], a content color volume SEI message is proposed to indicate the color volume occupied by the content. It uses an (x, y, Y) description of the color coordinates and has slices of luminance Y with associated polygons for each slice. These proposals have multiple shortcomings such as: provide information of little use to most display manufacturers, may add significant overhead, and may require too much computational overhead to generate. To improve existing coding and decoding schemes, as appreciated by the inventors here, improved techniques for generating and communicating source color volume information are required.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 2 depicts an example of a "largest" possible color volume plot for a video container format;

FIG. 3A depicts an example of source content gamut within the container color volume;

DESCRIPTION OF EXAMPLE EMBODIMENTS

Techniques for communicating source color volume information using SEI messaging are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to techniques for communicating source color volume information using SEI messaging. In a decoder, a processor for extracting SEI messaging receives a source color volume identification messaging variable identifying the presence of source color volume information in an input bitstream. The processor receives a first messaging variable as part of the source color volume information. If the first messaging variable matches a first predetermined value, then for one or more color primaries, it generates x and y chromaticity coordinates for the one or more color primaries based on the source color volume information in the input bitstream. It generates a minimum, a maximum, and an average luminance value based on the source color volume information in the input bitstream. The processor receives a second messaging variable as part of the source color volume information, and if the second messaging variable matches a second predetermined value, then for one or more color primaries, it generates x and y chromaticity coordinates for the one or more color primaries corresponding to the minimum, maximum, and average luminance values based on the source color volume information.

Examples of Source Color Volume Messaging

Figure 1:
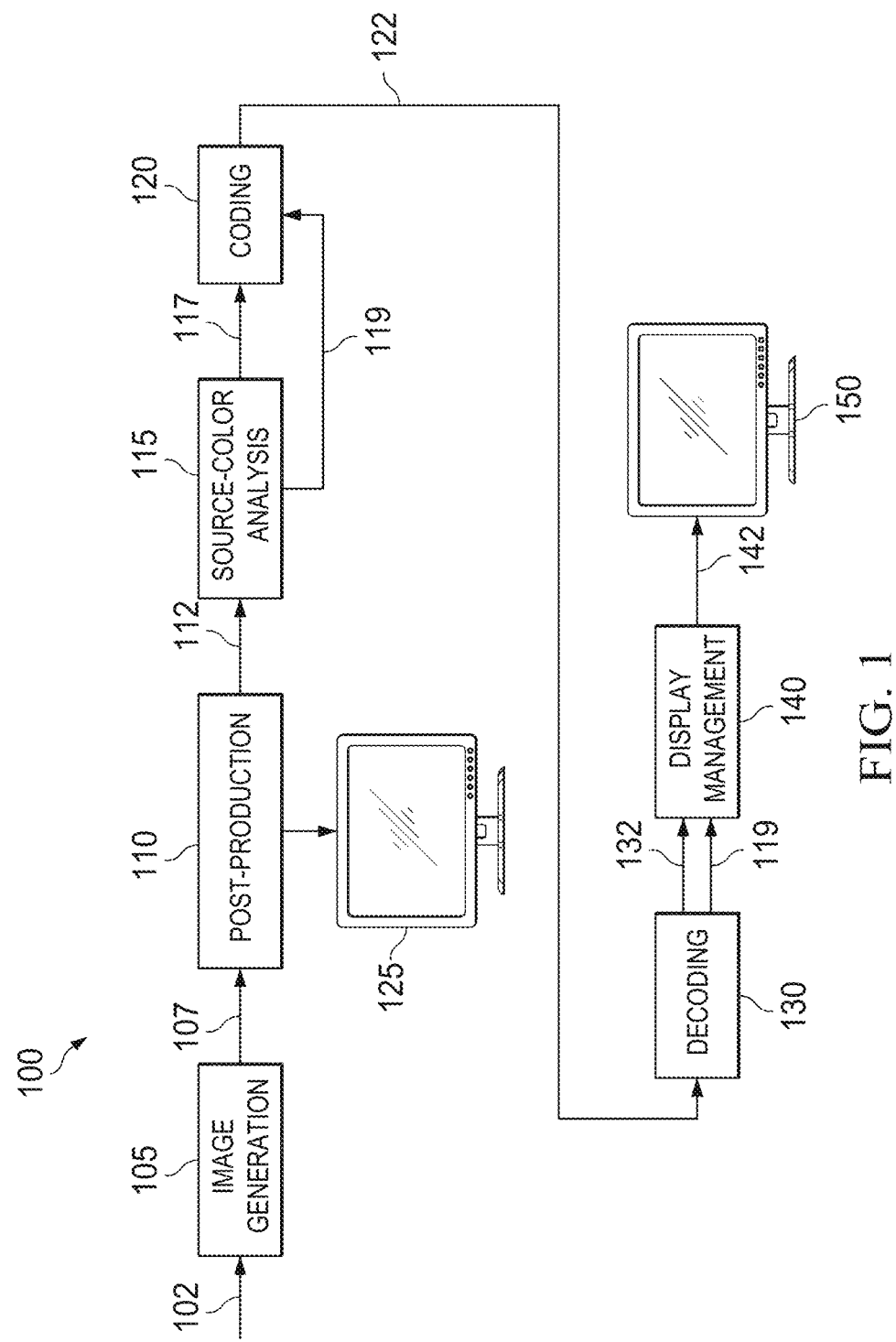
FIG. 1 depicts an example process for a video delivery pipeline according to an embodiment of this invention.

FIG. 1 depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film, after appropriate editing (not shown), is converted to a digital format to provide video data (107).

The video data (107) is then provided to a processor at block (110) for post-production editing. Post-production editing (110) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, image cropping, addition of computer-generated visual special effects, etc.) may be performed at block (110) to yield a final version (112) of the production for distribution. During post-production editing (110), video images are viewed on a reference display (125) (also to be referred to as the "targeted display") since the studio optimizes the video for).

In some embodiments, before video coding (120), video content may be analyzed to extract source-color-volume metadata (119), for example as defined in SMPTE ST 2094-1 [5], or as will be defined later in this invention. Such metadata may also define the characteristics of the targeted display (e.g., reference display (125)) and color remapping information so that a downstream receiver can render the decoded data in the best possible way.

Following post-production (110) and source-color volume analysis (115), video data of the final production (117) and associated metadata (119) may be delivered in an appropriate color format (e.g., 10-bit YCbCr in 4:2:0, ICtCp, and the like) to encoding block (120) for delivering downstream to decoding and playback devices such as television sets, set-top boxes, movie theaters, and the like. In some embodiments, coding block (120) may include audio and video encoders, such as those defined by ATSC, DVB, DVD, Blu-Ray, and other delivery formats, to generate coded bit stream (122). Coded bitstream (122) may be represented by a single layer video coded bitstream or by a multi-layer bitstream. For example, in a multi-layer bitstream, signal (122) may include a base layer (say, an SDR layer or a 10-bit HDR (HDR10) layer) and an enhancement layer, which when combined with the base layer yields a HDR bitstream with higher dynamic range than the base layer alone (e.g., a 12-bit HDR signal). Signal (122), the output bitstream from the encoder (120) may also include metadata (119) and additional coding-related metadata, such as prediction parameters and other data to assist a decoder to better reconstruct an HDR signal.

In a receiver, the coded bit stream (122) is decoded by decoding unit (130) to generate a decoded signal (132) and associated metadata (119). The receiver (or target) display (150) may have completely different characteristics than the reference (or targeted) display (125). For example, without limitation, the reference display (125) may be a 1,000 nits display while the receiver display may be a 500 nits display. In that case, a display management module (140) may be used to map the dynamic range of decoded signal (132) to the characteristics of the receiver display (150) by generating display-mapped signal (142). As used herein, the term "display management" denotes the processing (e.g., tone and gamut mapping) required to map an input video signal of a first dynamic range (e.g., 1000 nits) to a display of a second dynamic range (e.g., 500 nits). Display management unit (140) may take into consideration metadata (119) to improve the quality of the output video on display (150). For example, as shown in [7], information about the luminance range of the targeted (or reference) display (e.g., 125) and the source data may be used on a receiver to better map the dynamic range of the video content into the receiver display (e.g., 150).

Color Volume Information

FIG. 2 depicts an example of the "largest" possible color volume of a pre-defined container format (e.g., BT. 2020) (also to be referred as the "container color volume"). Such a volume can be constructed by two-dimensional (2D) color-gamut primaries, the white point chromaticity (e.g., D65), a maximum luminance value (e.g., Lmax=4,000 nits), and a minimum luminance value (e.g., 0.005 nits). Such a plot indicates the largest possible color volume boundary for all the colors within the source video content.

Figure 3B:
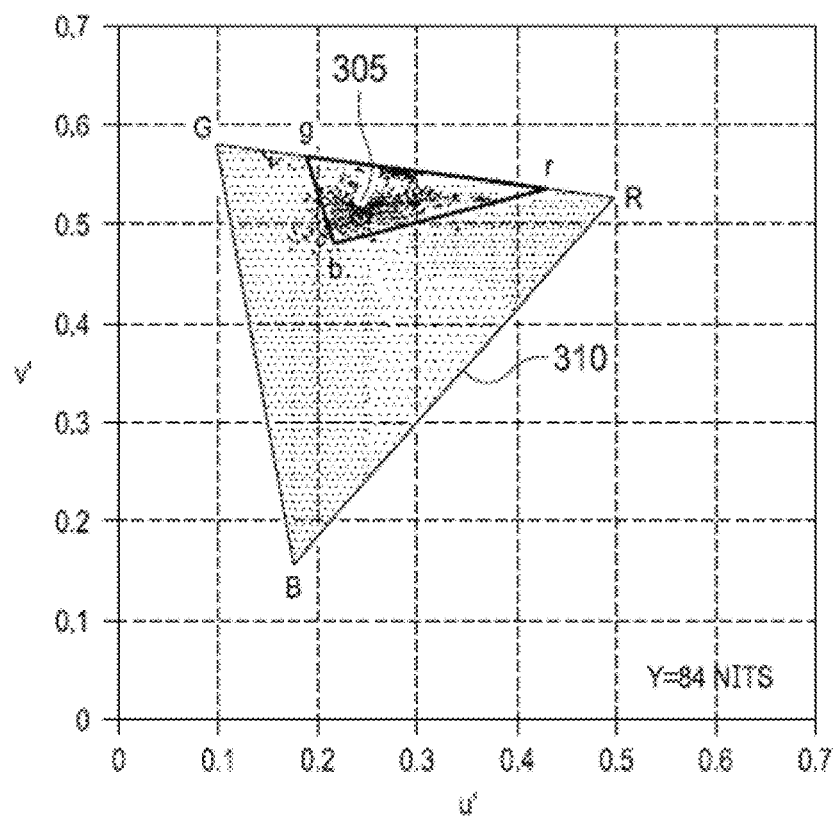
FIG. 3B and FIG. 3C depict examples of 2D slices of the container and source color volume at specific luminance (Y) values.
Figure 3C:
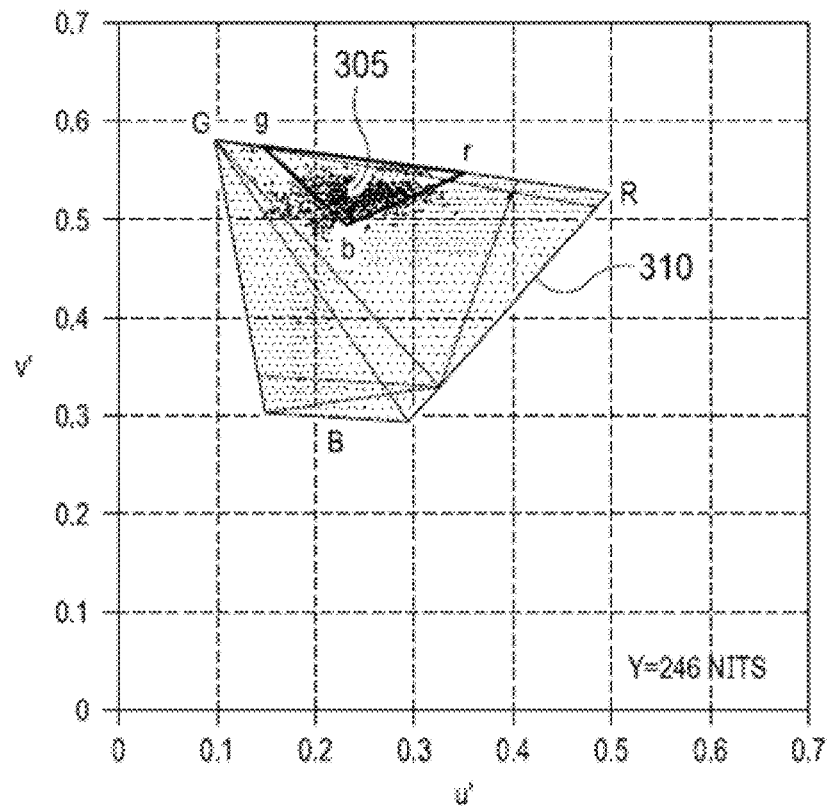

In practice, as depicted by the darker "cloud" (305) in FIG. 3A or the darker regions (305) in FIG. 3B and FIG. 3C, the source-color volume of the source content (e.g., 112) for a particular frame, or even within a whole scene, may be significantly smaller than the largest possible color volume (310). Because the actual color volume (305) has very irregular shape, transmitting such source color volume information for each frame or the whole scene requires lots of information. For example, in an embodiment, one may signal the color gamut information for multiple luminance values (say, at 0.1, 1, 10, and the like). The question then becomes: how many and which are the most important luminance values? One also needs to take into consideration not only the required overhead of such information on the coded bit stream, but also the complexity of generating such content on an encoder and/or reconstructing color volume information on the decoder.

While communicating minimum and maximum luminance values in the source content is important, as appreciated by the inventors, communicating the average luminance (or mid-point luminance) is also valuable to a receiver. These three values together can help generate a reasonable tone curve for display mapping. In this disclosure, it is proposed to signal the following metadata to describe source color volume: a) the largest 2D color gamut the source occupied (e.g., the source color volume); b) the maximum, minimum and average luminance of the source; and c)

optionally, the sliced (2D) color gamut for those three luminance values (e.g., see FIGS. 3B and 3C). It is assumed that the white points of the container primary and the source content primary should be the same, so there is no reason to retransmit such information. This information may be updated as needed, e.g., on a per-frame or a per-scene basis. FIG. 3B and FIG. 3C depict examples of 2D slices of the source color volume (305) and the container color volume (310) at specific luminance (Y) values. In FIG. 3B, the 2D slice is at Y=84 nits, and in FIG. 3C, the 2D slice is at Y=246 nits. The chromaticity (rgb) triangles, surrounding source color volume (305) and within the container RGB space, are provided for illustration purposes only. An encoder may select to define and communicate to a receiver smaller or bigger such areas.

Table 1 depicts an example of source-color volume SEI messaging according to an embodiment that follows the nomenclature and syntax of the H.265 specification. The description of color primaries follows the definition of CIE 1931 (x,y) color chromaticity coordinates for color primaries as defined in ISO 11664-1 (see also ISO 11664-3 and CIE 15), and uses red, green, and blue color primaries. Other types of color primaries, such four, five, or six, or other polygon-based color primary presentation can also be used. For the largest actual color gamut within the source content, in an embodiment, without limitation, the syntax is similar to the definition of the colour_primaries parameter (or variable) defined in Section E.3.1, for Table E.3, of the H.265 specification. It is believed that current source content can reach the P3 color space, but it will take some time to reach BT. 2020/2010 color ("DCI-P3" is defined in SMPTE EG 432-1 and SMPTE RP 431-2). Therefore, in those cases where the source color gamut is smaller or equal to P3, or equal to BT. 2020/2010 color primaries, Table E.3 can be used; however, for sources whose color gamut is larger than P3 but smaller than BT. 2020/2010, explicit signaling of color gamut might be required. Luminance values are specified using their absolute value in nits (cd/m$^2$). Alternatively, to save bits, luminance values may also be encoded using a non-linear representation, e.g., as values encoded according to the inverse EOTF of SMPTE ST 2084. The color gamut information corresponding to the max, min, and average (mid) luminance values is made optional, allowing applications to reduce the metadata overhead as desired.

Notes: in a preferred embodiment, 1) the source color volume metadata should describe the color volume of the source in its original form, before any luma or chroma pre-processing. For example, it should describe source color volume before any chroma subsampling process (e.g., from 4:4:4 to 4:2:0) or bit depth conversion process (e.g., from 12 b to 10 b), because chroma subsampling or bit depth conversion will modify the color volume information. 2) The source color gamut is typically different from the container color primaries, which is indicated in Annex E (e.g., Table E.3) of H.265. 3) The source color volume is typically different from the mastering display color volume, which may be indicated by the mastering display color volume SEI messages.

In an example embodiment, parameters (or variables) and coding semantics in Table 1 may be described as follows:

source_colour_volume_id contains an identifying number that may be used to identify the purpose of the source color volume. The value of source_colour_volume_id shall be in the range of 0 to $2^{32}-2$, inclusive. Values of source_colour_volume_id from 0 to 255 and from 512 to $2^{31}-1$ may be used as determined by the application. Values of source_colour_volume_id from 256 to 511, inclusive, and from $2^{31}$ to $2^{32}-2$, inclusive, are reserved for future use by ITU-T|ISO/IEC. Decoders shall ignore all color remapping information SEI messages containing a value of source_colour_volume_id in the range of 256 to 511, inclusive, or in the range of $2^{31}$ to $2^{32}-2$, inclusive, and bitstreams shall not contain such values.

source_colour_volume_cancel_flag equal to 1 indicates that the source color volume SEI message cancels the persistence of any previous source color volume SEI message in output order that applies to the current layer. source_colour_volume_cancel_flag equal to 0 indicates that source color volume follows.

source_colour_volume_persistence_flag specifies the persistence of the source color volume SEI message for the current layer. source_colour_volume_persistence_flag equal to 0 specifies that the source color volume information applies to the current picture only.

Let picA be the current picture. source_colour_volume_persistence_flag equal to 1 specifies that the source color volume persists for the current layer in output order until either of the following conditions is true:

A new coded-layer video sequence (CLVS) of the current layer begins

The bitstream ends

A picture picB in the current layer in an access unit containing a source color volume SEI message with the same value of source_colour_volume_id and applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for picture order count for picB.

source_colour_primaries has the same semantics as specified in clause E.3.1 for the colour_primaries syntax element, except colour_primaries in clause E.3.1 signals the container source color primaries and source_colour_primaries signals the color primaries the source content truly occupies.

When the value of source_colour_primaries is equal to 2, the source_colour_primaries is explicitly specified by syntax source_primaries_x[c] and source_primaries_y[c].

source_primaries_x[c] and source_primaries_y[c] specify the normalized x and y chromaticity coordinates, respectively, of the color primary component c of the source content in increments of 0.00002, according to the CIE 1931 definition of x and y as specified in ISO 11664-1 (see also ISO 11664-3 and CIE 15). For describing the source content that use red, green, and blue color primaries, it is suggested that index value c equal to 0 should correspond to the green primary, c equal to 1 should correspond to the blue primary, and c equal to 2 should correspond to the red color primary (see also Annex E and Table E.3). The values of source_primaries_x[c] and source_primaries_y[c] shall be in the range of 0 to 50,000, inclusive.

max_source_luminance, min_source_luminance and avg_source_luminance specify the nominal maximum, minimum and average luminance, respectively, of the source in units of 0.0001 candelas per square metre (nits). min_source_luminance shall be less than avg_source_luminance and avg_source_luminance shall be less than max_source_luminance.

luminance_colour_primaries_info_present_flag equal to 1 specifies that syntax elements luminance_primaries_x and luminance_primaries_y are present, luminance_colour_primaries_info_present_flag equal to 0 specifies that syntax elements luminance_primaries_x and luminance_primaries_y are not present.

luminance_primaries_x[i][c] and luminance_primaries_y[i][c] specify the normalized x and y chromaticity coordinates, respectively, of the color primary component c of the source content at one nominal luminance in increments of 0.00002, according to the CIE 1931 definition of x and y as specified in ISO 11664-1 (see also ISO 11664-3 and CIE 15). For describing the source content luminance, the index value 0, 1 and 2 shall correspond to max_source_luminance, min_source_luminance and avg_source_luminance, respectively. For describing the source content that use red, green, and blue color primaries, it is suggested that index value c equal to 0 should correspond to the green primary, c equal to 1 should correspond to the blue primary, and c equal to 2 should correspond to the red color primary (see also Annex E and Table E.3). The values of source_primaries_x[c] and source_primaries_y[c] shall be in the range of 0 to 50,000, inclusive.

Table 1 provides what is believed to be the minimal information for a useful representation of source color volume. In an another embodiment, one may decide to define additional details, like multiple primary expressions [3] or the description of the color primaries of more than three slices of luminance (Y), with associated polygons for each slice.

TABLE 1

Example of source color volume SEI messaging syntax

| | Descriptor |
|---|---|
| source_colour_volume( payloadSize ) { | |
|   source_colour_volume_id | ue(v) |
|   source_colour_volume_cancel_flag | u(1) |
|   if( !source_colour_volume_cancel_flag ) { | |
|     source_colour_volume_persistence_flag | u(1) |
|     source_colour_primaries | u(8) |
|     if( source_colour_primaries == 2 ) { | |
|       for( c = 0; c < 3; c++ ) { | |
|         source_primaries_x[ c ] | u(16) |
|         source_primaries_y[ c ] | u(16) |
|       } | |
|     } | |
|     max_source_luminance | u(32) |
|     min_source_luminance | u(32) |
|     avg_source_luminance | u(32) |
|     luminance_colour_primaries_info_present_flag | u(1) |
|     if( luminance_colour_primaries_info_present_flag ) { | |
|       for( i = 0; i <= 3; i++ ) { | |
|         for( c = 0; c < 3; c++ ) { | |
|           luminance_primaries_x[ i ][ c ] | u(16) |
|           luminance_primaries_y[ i ][ c ] | u(16) |
|         } | |
|       } | |
|     } | |
|   } | |
| } | |

Figure 4:
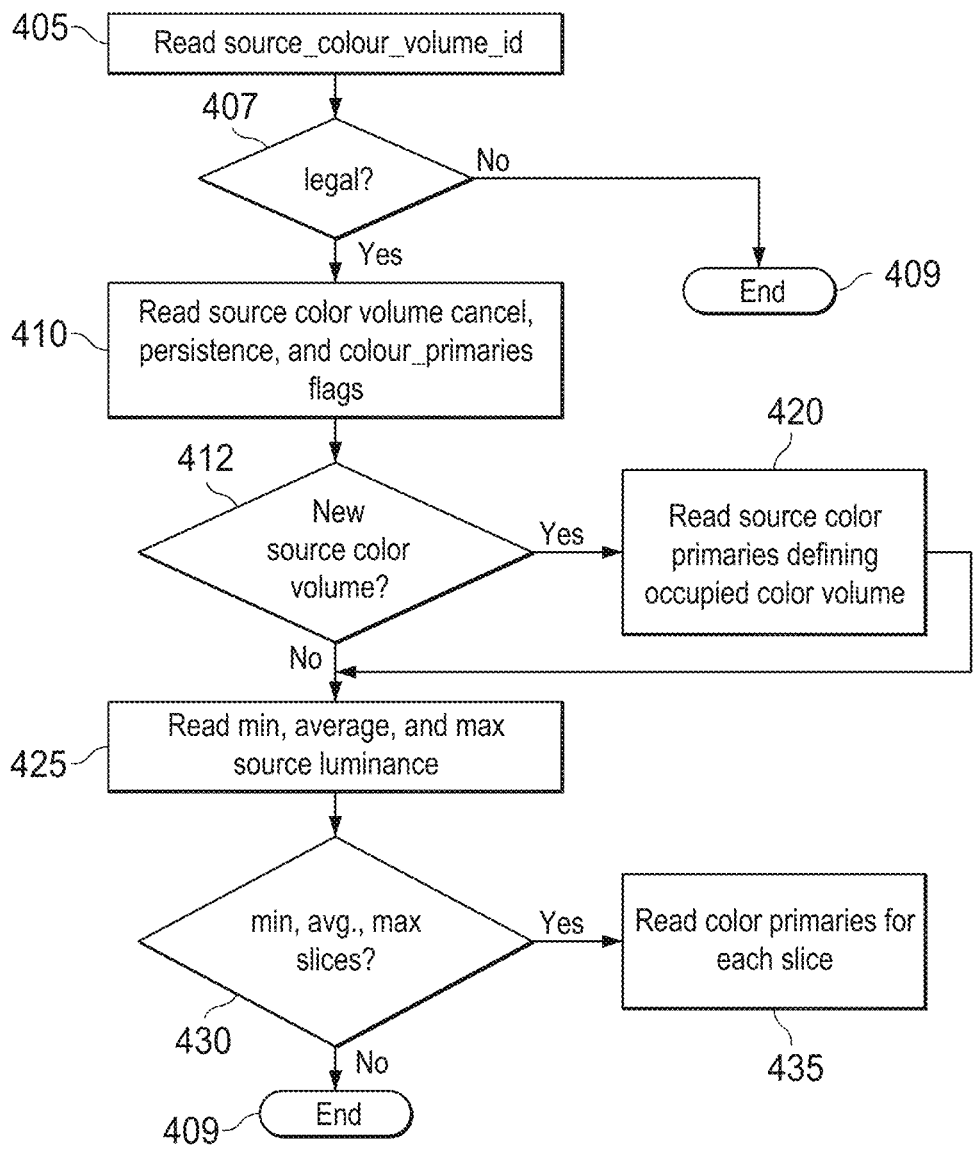
FIG. 4 depicts an example process for extracting source color volume information from SEI messaging according to an embodiment of this invention.

FIG. 4 depicts an example process for extracting color volume information for a video source using SEI messaging according to an embodiment. First (405), a decoder may detect whether a first SEI messaging variable indicating an identifying number (ID) of source color volume information (e.g., source_colour_volume_id) is present. Then, given the presence of such a variable, the decoder may check (step 407) whether its value is within a permissible range. If it is an illegal value, then the process terminates (step 409). If it is a legal value, then in step (410), as shown also in Table 1, the decoder can read additional flags related to the persistence of the first variable across the bit stream (e.g., see the syntax elements for source_colour_volume_cancel_flag and source_colour_volume_persistence_flag). In step (412), via a second SEI messaging parameter (e.g., source_colour_primaries), a decoder may check whether the metadata define explicitly the color volume that source data content truly occupies. If it is true (e.g., source_colour_primaries=2) then, in step (420), the (x, y) color chromaticity coordinates for each color primary (e.g., red, green, and blue) are read, otherwise, in step (425), the decoder extracts the minimum, maximum, and average luminance values. Optionally, SEI messaging may also define the (x, y) color chromaticity coordinates corresponding to the color primaries of the min, mid, and max luminance values defined earlier. In an embodiment, this may be indicated by a third parameter (e.g., luminance_colour_primaries_info_present_flag=1). If no such information is present (step 430), then the process terminates (409), otherwise, (in step 435), the decoder extracts the (x, y) color chromaticity coordinates for the color primaries for each of the min, mid, and max luminance values.

After extracting the source color volume information, a decoder may use the source color volume data during its display management process (e.g., 140). In an example, display management may include two steps: tone mapping and gamut mapping. The min, mid, and max luminance value can be used to generate a tone mapping curve as described in [6-7]. The maximal RGB color gamut and the sliced RGB gamut can be used to perform gamut mapping.

Active Region Considerations

In some embodiments it may be beneficial to define an active region as part of the metadata related to the source color volume. For example, when video is encoded in a letterbox format, encoders and decoders should not include the black letterbox areas when computing luma and chroma characteristics of each video frame (e.g., min, max, and average luminance). Experimental results have shown that taking into consideration the "framing" or "matting" (e.g., pillarboxing, windowboxing, and letterboxing) of frames in a video sequence can improve significantly overall output picture quality. Though letter box detection can be implemented by a decoder, thus reducing the signaling overhead to define the active picture region, in an embodiment, such signaling may be explicitly signaled to support decoders with low computational complexity. Table 2 depicts an example of source-color volume SEI messaging with active region signaling according to an embodiment.

TABLE 2

Example of source color volume SEI message syntax with active region signaling

| | Descriptor |
|---|---|
| source_colour_volume( payloadSize ) { | |
|   source_colour_volume_id | ue(v) |
|   source_colour_volume_cancel_flag | u(1) |
|   if( !source_colour_volume_cancel_flag ) { | |
|     source_colour_volume_persistence_flag | u(1) |
|     source_colour_primaries | u(8) |
|     if( source_colour_primaries == 2) { | |
|       for( c = 0; c < 3; c++ ) { | |
|         source_primaries_x[ c ] | u(16) |
|         source_primaries_y[ c ] | u(16) |
|       } | |
|     } | |
|     max_source_luminance | u(32) |
|     min_source_luminance | u(32) |
|     avg_source_luminance | u(32) |
|     luminance_colour_primaries_info_present_flag | u(1) |
|     if(luminance_colour_primaries_info_present_flag) { | |
|       for( i = 0; i <= 3; i++ ) { | |
|         for( c = 0; c < 3; c++ ) { | |

TABLE 2-continued

Example of source color volume SEI message syntax with active region signaling

| | Descriptor |
|---|---|
| luminance_primaries_x[ i ][ c ] | u(16) |
| luminance_primaries_y[ i ][ c ] | u(16) |
| } | |
| } | |
| } | |
| active_region_flag | u(1) |
| if (active_region_flag) { | |
| active_region_left_offset | ue(v) |
| active_region_right_offset | ue(v) |
| active_region_top_offset | ue(v) |
| active_region_bottom_offset | ue(v) |
| } | |
| } | |
| } | |

Table 2 is a superset of Table 1 and considers two different semantics of defining an active region.

Semantic 1. In an embodiment, the active region is specified relative to the decoded picture, before conformance window cropping and output. Then the active region parameters may be interpreted as follows:

active_region_flag equal to 1 indicates that the active region offset parameters follow next in the source colour volume information SEI message. active_region_flag equal to 0 indicates that the active region offset parameters are not present.

active_region_left_offset, active_region_right_offset, active_region_top_offset, and active_region_bottom_offset specify an active rectangular region. When active_region_flag is equal to 0, the values of active_region_left_offset, active_region_right_offset, active_region_top_offset, and active_region_bottom_offset are inferred to be equal to 0.

The active region is defined with horizontal picture coordinates from SubWidthC*active_region_left_offset to pic_width_in_luma_samples−(SubWidthC*active_region_right_offset+1) and vertical picture coordinates from SubHeightC*active_region_top_offset to pic_height_in_luma_samples−(SubHeightC*active_region_bottom_offset+1), inclusive. The value of SubWidthC*(active_region_left_offset+active_region_right_offset) shall be less than pic_width_in_luma_samples, and the value of SubHeightC*(active_region_top_offset+active_region_bottom_offset) shall be less than pic_height_in_luma_samples.

Semantic 2. In an embodiment, the active region offset values are defined relative to the final output picture to display, therefore the conformance window parameters need to be taken into consideration. Then the active region parameters may be interpreted as follows:

active_region_flag equal to 1 indicates that the active region offset parameters follow next in the source colour volume information SEI message. active_region_flag equal to 0 indicates that the active region offset parameters are not present.

active_region_left_offset, active_region_right_offset, active_region_top_offset, and active_region_bottom_offset specify an active rectangular region. When active_region_flag is equal to 0, the values of active_region_left_offset, active_region_right_offset, active_region_top_offset, and active_region_bottom_offset are inferred to be equal to 0.

The active region is defined with horizontal picture coordinates from active_region_left_offset+SubWidthC*conf_win_left_offset to CtbSizeY*PicWidthInCtbsY−SubWidthC*conf_win_right_offset−active_region_right_offset−1 and vertical picture coordinates from active_region_top_offset+SubHeightC*conf_win_top_offset to CtbSizeY*PicHeightInCtbsY−SubHeightC*conf_win_bottom_offset−active_region_bottom_offset−1, inclusive.

The value of (active_region_left_offset+active_region_right_offset) shall be less than CtbSizeY*PicWidthInCtbsY−SubWidthC*(conf_win_right_offset+conf_win_left_offset), and the value of (active_region_top_offset+active_region_bottom_offset) shall be less than CtbSizeY*PicHeightInCtbsY−SubHeightC*(conf_win_bottom_offset+conf_win_top_offset).

Each of the references listed below is incorporated herein by reference in its entirety.

REFERENCES

[1] Rec. ITU-T H.265, "Series H: Audiovisual and Multimedia systems, Infrastructure of audiovisual services—Coding of moving video, High efficiency video coding," ITU, October 2014.

[2] H. M. Oh et al., "Content colour gamut SEI message", JCTVC-X0040, May 2016, Geneva, CH.

[3] A. M. Tourapis, "Improvements to the Effective Colour Volume SEI", JCTVC-X0052, May 2016, Geneva, CH.

[4] A. K. Ramasubramonian, "Content colour volume SEI message", JCTVC-X0052, May 2016, Geneva, CH.

[5] SMPTE ST 2094-1:2016: "Dynamic Metadata for Color Volume Transform—Core Components," SMPTE, May 18, 2016.

[6] SMPTE ST 2094-10:2016: "Dynamic Metadata for Color Volume Transform—Application #1," SMPTE, May 18, 2016.

[7] R. Atkins et al., U.S. Patent Publication US2016/0005349, "Display management for high dynamic range video."

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions related to communicating source color volume information using SEI messaging, such as those described herein. The computer and/or IC may compute any of a variety of parameters or values that relate to the processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to communicating source color volume information using SEI messaging as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to communicating source color volume information using SEI messaging are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method in a decoder to extract source color volume information of an input bitstream from a supplemental enhancement information (SEI) message, the method executed on a processor, the method comprising:
   receiving an SEI message comprising one or more source color SEI parameters, the one or more source color SEI parameters comprising color primary component parameters and luminance value parameters;
   for a color primary component c, extracting x and y chromaticity coordinates from the color primary component parameters, wherein the x and y chromaticity coordinates define, respectively, normalized x and y chromaticity coordinates of the color primary component c of the input bitstream; and
   extracting a minimum, a maximum, and an average luminance value from the luminance value parameters, wherein for one or more coded video pictures in the bitstream that are encoded in a letterbox format, the minimum, the maximum, and the average luminance values are for an active region of the one or more coded video pictures in the letterbox format.

2. The method of claim 1, further comprising generating an output video signal based on the input bitstream, the x and y chromaticity coordinates for the color primary component c, and the minimum, the maximum, and the average luminance value.

3. The method of claim 1, wherein the x and y chromaticity coordinates are specified in increments of 0.00002, according to the CIE 1931 definition of x and y as specified in ISO 11664-1.

4. The method of claim 1, wherein for describing color volumes that use red, green, and blue color primaries, c=0 corresponds to the green color primary, c=1 corresponds to the blue color primary, and c=2 corresponds to the red color primary.

* * * * *